(12) United States Patent
Brown et al.

(10) Patent No.: US 11,884,298 B2
(45) Date of Patent: Jan. 30, 2024

(54) SAFE DRIVING OPERATIONS OF AUTONOMOUS VEHICLES

(71) Applicant: TUSIMPLE, INC., San Diego, CA (US)

(72) Inventors: Robert Patrick Brown, San Diego, CA (US); Todd B. Skinner, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 182 days.

(21) Appl. No.: 17/497,149

(22) Filed: Oct. 8, 2021

(65) Prior Publication Data

US 2022/0126866 A1  Apr. 28, 2022

Related U.S. Application Data

(60) Provisional application No. 63/105,064, filed on Oct. 23, 2020.

(51) Int. Cl.
*B60W 60/00* (2020.01)
*B60W 10/18* (2012.01)
(Continued)

(52) U.S. Cl.
CPC ........ *B60W 60/0015* (2020.02); *B60W 10/18* (2013.01); *B60W 40/04* (2013.01);
(Continued)

(58) Field of Classification Search
CPC .. B60W 60/0015; B60W 10/18; B60W 40/04; B60W 40/105; B60W 2554/20;
(Continued)

(56) References Cited

U.S. PATENT DOCUMENTS 8,547,250 B1 * 10/2013 Al-Mutawa ........... B60W 10/18
340/903
8,849,557 B1 * 9/2014 Levandowski ........ G06V 20/56
701/300

(Continued)

FOREIGN PATENT DOCUMENTS

AU   2018267553 B2 *  8/2019
CN   114379590 A   *  4/2022
(Continued)

OTHER PUBLICATIONS

European Patent Office, Extended European search report for EP 21201600, dated Mar. 14, 2022, 10 pages with English translation.
(Continued)

*Primary Examiner* — Atul Trivedi
(74) *Attorney, Agent, or Firm* — Perkins Coie LLP; Paul Liu

(57) ABSTRACT

An autonomous vehicle includes a detection system for identifying the presence of authorities or emergency vehicles on a road, such as law enforcement vehicles, fire engines, fire trucks, police officers, first responders, traffic cones, flares, etc. The detection system may include audio and visual detection system dedicated to the detection of authorities. Additionally, systems that correlate the detected authorities and/or any audible or visual instructions given by the authorities to changes in the behavior of the autonomous vehicle. The autonomous vehicle may react to the detected authorities or emergency vehicles by determining a driving related operation to safely operate around the detected authorities or emergency vehicles.

19 Claims, 4 Drawing Sheets

(51) Int. Cl.
   *B60W 40/04*    (2006.01)
   *B60W 40/105*   (2012.01)
(52) U.S. Cl.
   CPC ....... *B60W 40/105* (2013.01); *B60W 2420/42* (2013.01); *B60W 2420/54* (2013.01); *B60W 2554/20* (2020.02); *B60W 2554/402* (2020.02); *B60W 2554/4041* (2020.02); *B60W 2554/80* (2020.02); *B60W 2710/18* (2013.01)
(58) Field of Classification Search
   CPC ... B60W 2554/402; B60W 2554/4041; B60W 2554/80; B60W 2420/42; B60W 2420/54; B60W 2710/18
   USPC ............................................................ 701/23
   See application file for complete search history.

(56)                    References Cited

U.S. PATENT DOCUMENTS

| | | | | |
|---|---|---|---|---|
| 8,884,782 | B2 * | 11/2014 | Rubin | H04W 74/0816 |
| | | | | 340/436 |
| 9,841,767 | B1 * | 12/2017 | Hayward | G08G 1/0133 |
| 10,216,194 | B1 * | 2/2019 | Hayward | G01C 21/3655 |
| 10,599,155 | B1 * | 3/2020 | Konrardy | B60W 10/04 |
| 11,364,910 | B1 * | 6/2022 | Schmitt | G06F 18/2193 |
| 11,441,916 | B1 * | 9/2022 | Konrardy | H04W 4/40 |
| 2004/0193374 | A1 * | 9/2004 | Hac | G08G 1/166 |
| | | | | 701/301 |
| 2015/0243165 | A1 * | 8/2015 | Elsheemy | G08G 1/096775 |
| | | | | 340/906 |
| 2016/0231746 | A1 * | 8/2016 | Hazelton | G05D 1/0274 |
| 2018/0052463 | A1 * | 2/2018 | Mays | B60W 60/007 |
| 2018/0211528 | A1 * | 7/2018 | Seifert | G06V 20/58 |
| 2019/0066498 | A1 * | 2/2019 | Baldwin | G08G 1/0968 |
| 2019/0187719 | A1 * | 6/2019 | El-Khatib | G08G 1/167 |
| 2019/0250622 | A1 * | 8/2019 | Nister | B60W 60/0027 |
| 2019/0258251 | A1 * | 8/2019 | Ditty | B60W 50/023 |
| 2020/0017124 | A1 * | 1/2020 | Camhi | G06N 20/00 |
| 2020/0201323 | A1 * | 6/2020 | Park | B60W 50/04 |
| 2020/0257299 | A1 | 8/2020 | Wang et al. | |
| 2020/0031337 | A1 | 10/2020 | Soltanian et al. | |
| 2021/0201676 | A1 * | 7/2021 | Tariq | G08G 1/012 |
| 2021/0245741 | A1 * | 8/2021 | Asakura | G08G 1/0965 |
| 2021/0300306 | A1 * | 9/2021 | Costin | B60T 7/22 |
| 2022/0005291 | A1 * | 1/2022 | Konrardy | G07C 5/008 |
| 2022/0024483 | A1 * | 1/2022 | Choi | B64C 39/024 |
| 2022/0063622 | A1 * | 3/2022 | Jumpertz | B60W 10/00 |
| 2022/0219701 | A1 * | 7/2022 | Chikamori | B60W 30/18163 |
| 2022/0223036 | A1 * | 7/2022 | Chikamori | G08G 1/096716 |
| 2022/0223041 | A1 * | 7/2022 | Chikamori | G08G 1/096827 |
| 2023/0168683 | A1 * | 6/2023 | Chen | G06V 10/82 |
| | | | | 701/23 |

FOREIGN PATENT DOCUMENTS

| | | | | |
|---|---|---|---|---|
| DE | 102012024370 | A1 * | 7/2013 | |
| DE | 102019208647 | B3 | 8/2020 | |
| DE | 102019217704 | A1 * | 5/2021 | |
| DE | 102020103753 | A1 * | 8/2021 | |
| EP | 3703028 | A1 * | 9/2020 | B60K 35/00 |
| EP | 3965066 | A2 * | 3/2022 | |
| KR | 20200106131 | A * | 9/2020 | B60W 30/08 |
| KR | 20220013580 | A * | 2/2022 | |
| WO | WO-2016016756 | A1 * | 2/2016 | B60W 30/00 |
| WO | WO-2023028610 | A1 * | 3/2023 | |

OTHER PUBLICATIONS

"What to Do When an Emergency Vehicle Approaches," City of Roanoke, available at https://www.roanokeva.gov/622/What-to-Do-When-an-Emergency-Vehicle-App.

Becker, A., "Want to save a life? Follow rules of the road for drivers encountering emergency vehicles," Texas Medical Center, Oct. 25, 2018.

"Traffic Incident Management Quick Clearance Laws: A National Review of Best Practices," Federal Highway Administration Office of Operations, Dec. 2008, available at https://ops.fhwa.dot.gov/publications/fhwahop09005/move_over.htm.

"Sharing the Road," California Driver Handbook, California Department of Motor Vehicles, available at https://www.dmv.ca.gov/portal/handbook/california-driver-handbook/sharing-the-road/.

"Emergency Vehicle Response Safety," Arizona Emergency Information Network, May 21, 2021, available at https://ein.az.gov/emergency-information/emergency-bulletin/emergency-vehicle-response-safety.

"Several States Report a Spike in Drivers Crashing Into Police," National Highway Traffic Safety Administration, available at https://www.nhtsa.gov/several-states-report-spike-drivers-crashing-police.

* cited by examiner

SAFE DRIVING OPERATIONS OF AUTONOMOUS VEHICLES

PRIORITY CLAIMS AND RELATED PATENT APPLICATIONS

This patent document claims the priority to and the benefits of U.S. Provisional Application No. 63/105,064 entitled "LEGAL AUTHORITY DETECTION AND COMPLIANCE ON A ROADWAY BY AN AUTONOMOUS VEHICLE" filed on Oct. 23, 2020. The entire disclosure of the aforementioned application is hereby incorporated by reference as part of the disclosure of this application.

TECHNICAL FIELD

The present disclosure relates generally to autonomous vehicles. More particularly, the present disclosure is related to systems, apparatus, and methods for an autonomous vehicle (AV) to detect certain types of vehicles (e.g., law enforcement vehicles), official personnel (e.g., police officers), or stationary objects (e.g., flares or traffic cones or signage) so that the AV can operate appropriately.

BACKGROUND

One of the goals of autonomous vehicle technologies is to provide vehicles that can safely navigate towards a destination with limited or no driver assistance. In some cases, an autonomous vehicle may encounter authorities or emergency vehicles, in the form of law enforcement vehicles or official personnel. Alternatively, or additionally, local authorities may post signs, enable flashing lights, place flares, or otherwise visually indicate a deviation from normal traffic patterns in a section of roadway. Currently in such cases, an assistance of a driver is usually needed to manually drive the autonomous vehicle bypassing the unexpected situation. Previous systems do not currently enable autonomous vehicles to adequately detect authorities and comply with instructions or legal requirements without human intervention.

SUMMARY

Detection of certain types of vehicles (e.g., law enforcement and/or first responder vehicles), official personnel, audible instructions, and/or visual indicators can allow an autonomous vehicle to safely operate by complying with applicable laws. Such detection can also enable the autonomous vehicle to operate safely around persons and/or property surrounding the autonomous vehicle. Systems, apparatuses, and methods are described herein that allow an autonomous vehicle to detect the presence of authorities (e.g., certain type of vehicles and/or official personnel) and/or to perform driving related operations to comply with instructions and/or local laws for safe and lawful operation.

In an example embodiment, a method of autonomous driving operation includes determining, by a computer located in an autonomous vehicle, that an emergency vehicle is located on a road on which the autonomous vehicle is being driven; obtaining, in response to the determining, a driving related operation of the autonomous vehicle to operate around the emergency vehicle; and causing the autonomous vehicle to drive according to the driving related operation by sending instructions related to the driving related operation to one or more devices in the autonomous vehicle.

In some embodiments, the obtaining the driving related operation and the causing the autonomous vehicle to drive according to the driving related operation is performed in response to: (1) the determining that the emergency vehicle is located on the road, and (2) determining that the emergency vehicle is located within a pre-determined distance of a location of the autonomous vehicle. In some embodiments, the obtaining the driving related operation and the causing the autonomous vehicle to drive according to the driving related operation is performed in response to: (1) the determining that the emergency vehicle is located on the road, (2) determining that the emergency vehicle is located within a pre-determined distance of a location of the autonomous vehicle, and (3) determining that the emergency vehicle is operating a siren. In some embodiments, the obtaining the driving related operation includes: performing a first determination that a current speed of the autonomous vehicle is greater than a threshold value, and performing a second determination, in response to the first determination, of an amount of braking force to apply that reduces the current speed of the autonomous vehicle to less than or equal to the threshold value; and the instructions causing the autonomous vehicle to drive according to the driving related operation include a first instruction that cause the autonomous vehicle to apply the amount of braking force.

In some embodiments, the second determination is performed in response to the first determination and in response to a third determination that the autonomous vehicle is driving on a lane on the road immediately adjacent to an area or another lane where the emergency vehicle is located. In some embodiments, the obtaining the driving related operation includes: performing a first determination that the autonomous vehicle is driving on the road on a first lane having one side that is immediately adjacent to an area or another lane where the emergency vehicle is located, performing a second determination that the road includes a second lane immediately adjacent to the first lane and on another side opposite to the one side, and performing a third determination, in response to the first determination and the second determination, of an amount of steering to apply to steer the autonomous vehicle from the first lane to the second lane; the instructions causing the autonomous vehicle to drive according to the driving related operation include a first instruction that cause the autonomous vehicle to apply the amount of steering to steer the autonomous vehicle from the first lane to the second lane.

In some embodiments, a system for autonomous vehicle operation includes an autonomous vehicle comprising a computer that includes a processor configured to implement a method, comprising: determine that an emergency vehicle is located on a road on which the autonomous vehicle is being driven; obtain, in response to the determine, a driving related operation of the autonomous vehicle to operate around the emergency vehicle; and cause the autonomous vehicle to drive according to the driving related operation by the processor configured to send instructions related to the driving related operation to one or more devices in the autonomous vehicle.

In some embodiments, the processor of the computer is further configured to: send, to a second computer located outside of the autonomous vehicle, information related to the emergency vehicle, where the information includes a position information that indicates a position of the emergency vehicle, and where the information indicates that the emergency vehicle is located within a first pre-determined distance of a location of the autonomous vehicle; and where the second computer comprises a second processor configured to implement a second method, comprising: receive the information related to the emergency vehicle; in response to a determination that the second autonomous vehicle is located within a second pre-determined distance of a position of the emergency vehicle and that the second autonomous vehicle is driving towards the emergency vehicle: send the information related to the emergency vehicle to a second autonomous vehicle, where the second pre-determined distance is greater than or equal to the first pre-determined distance.

In some embodiments, the obtain the driving related operation is performed by the processor configured to: receive a traffic information of an area towards which the autonomous vehicle is driving; determine, based on the traffic information, that the area has a high traffic level; determine an alternate route to drive the autonomous vehicle around the area having the high traffic level; and determine the instructions for any one or more of a steering system, brakes, or transmission to cause the autonomous vehicle to drive on the alternate route. In some embodiments, the instructions for the driving related operation include a first instruction to apply brakes and a second instruction steer the autonomous vehicle from a lane on the road on which the autonomous vehicle is being driven and to an area along a side of the road. In some embodiments, the emergency vehicle includes a law enforcement vehicle, an ambulance, a fire engine, or a fire truck. In some embodiments, the emergency vehicle includes a stationary object that includes a traffic cone, a flare, or a traffic related signage.

In some embodiments, the obtaining the driving related operation and the causing the autonomous vehicle to drive according to the driving related operation is performed in response to: (1) determining that the emergency vehicle is driving towards the autonomous vehicle, (2) determining that the emergency vehicle is located within a pre-determined distance of a location of the autonomous vehicle, and (3) determining that the emergency vehicle is operating a siren. In some embodiments, the emergency vehicle is determined to be driving towards the autonomous vehicle upon determining that a first number of pixels associated with the emergency vehicle in a first image is less than a second number of pixels associated with the emergency vehicle in a second image, the first image and the second image are obtained by a camera on the autonomous vehicle, and the first image is obtained at a first time that is earlier in time than a second time when the second image is obtained. In some embodiments, the emergency vehicle is determined to be driving towards the autonomous vehicle upon determining that a first sound level associated with the siren is less than a second sound level associated with the siren, the first sound level and the second sound level are obtained by a microphone on the autonomous vehicle, and the first sound level is obtained at a first time that is earlier in time than a second time when the second sound level is obtained.

In some embodiments, the driving related operation is obtained based on a location of the autonomous vehicle and based on a rule associated with the emergency vehicle of a state or of an area in which the autonomous vehicle is located. In some embodiments, the driving related operation is obtained using a pre-configured set of rules stored in the computer for a plurality of states or areas, each rule is associated with at least one state or at least one area and a corresponding driving related rule associated with at least one emergency vehicle, and the plurality of states or areas include the state or the area in which the autonomous vehicle is located. In some embodiments, the method further includes sending, to a second computer located outside of the autonomous vehicle, information related to the emergency vehicle; and where the obtaining the driving related operation includes receiving, from the second computer, the instructions related to the driving related operation. In some embodiments, the information is sent to the second computer in response to determining that one or more attributes of the emergency vehicle cannot be determined by the computer in the autonomous vehicle.

In yet another exemplary aspect, the above-described method is embodied in a non-transitory computer readable storage medium comprising code that when executed by a processor, causes the processor to perform the methods described in this patent document.

In yet another exemplary embodiment, a device that is configured or operable to perform the above-described methods is disclosed. In yet another exemplary embodiment, a system that includes a computer with a processor configured or operable to perform the above-described methods is disclosed.

The above and other aspects and their implementations are described in greater detail in the drawings, the descriptions, and the claims.

DETAILED DESCRIPTION

Vehicles traversing highways and roadways are legally required to comply with authorities or emergency vehicles to safely operate the vehicles. For autonomous vehicles, such as autonomous tractor trailer vehicles, detection of authorities or emergency vehicles such as emergency vehicles, official personnel and/or visual instructions (e.g., signs) on the road is essential for lawful and safe operation of the vehicle. This patent document describes systems, apparatuses and methods for safe and lawful operation of an autonomous vehicle on a roadway, including detection of a presence of authorities and/or visual instructions, and execution of driving related operations so that the autonomous vehicle can comply with the law.

Section I of this patent document provides an overview of the devices and/or systems located on or in an autonomous vehicle, such as an autonomous tractor trailer vehicle. Section II of this patent document describes techniques to detect a presence of an authority on a road and/or to perform driving related operations in response to detecting the presence of the authority on the road. In this patent document, the term "authority" or "emergency vehicle" may include law enforcement vehicles, fire engines/trucks, ambulance, military vehicles, or may include stationary objects such as traffic cones, flares, signage, etc. Section III of this patent document describes an oversight system with which one or more autonomous vehicles can communicate regarding the presence of the authority to facilitate appropriate driving related The example headings for the various sections below are used to facilitate the understanding of the disclosed subject matter and do not limit the scope of the claimed subject matter in any way. Accordingly, one or more features of one example section can be combined with one or more features of another example section.

I. Autonomous Vehicle Ecosystem

Figure 1:
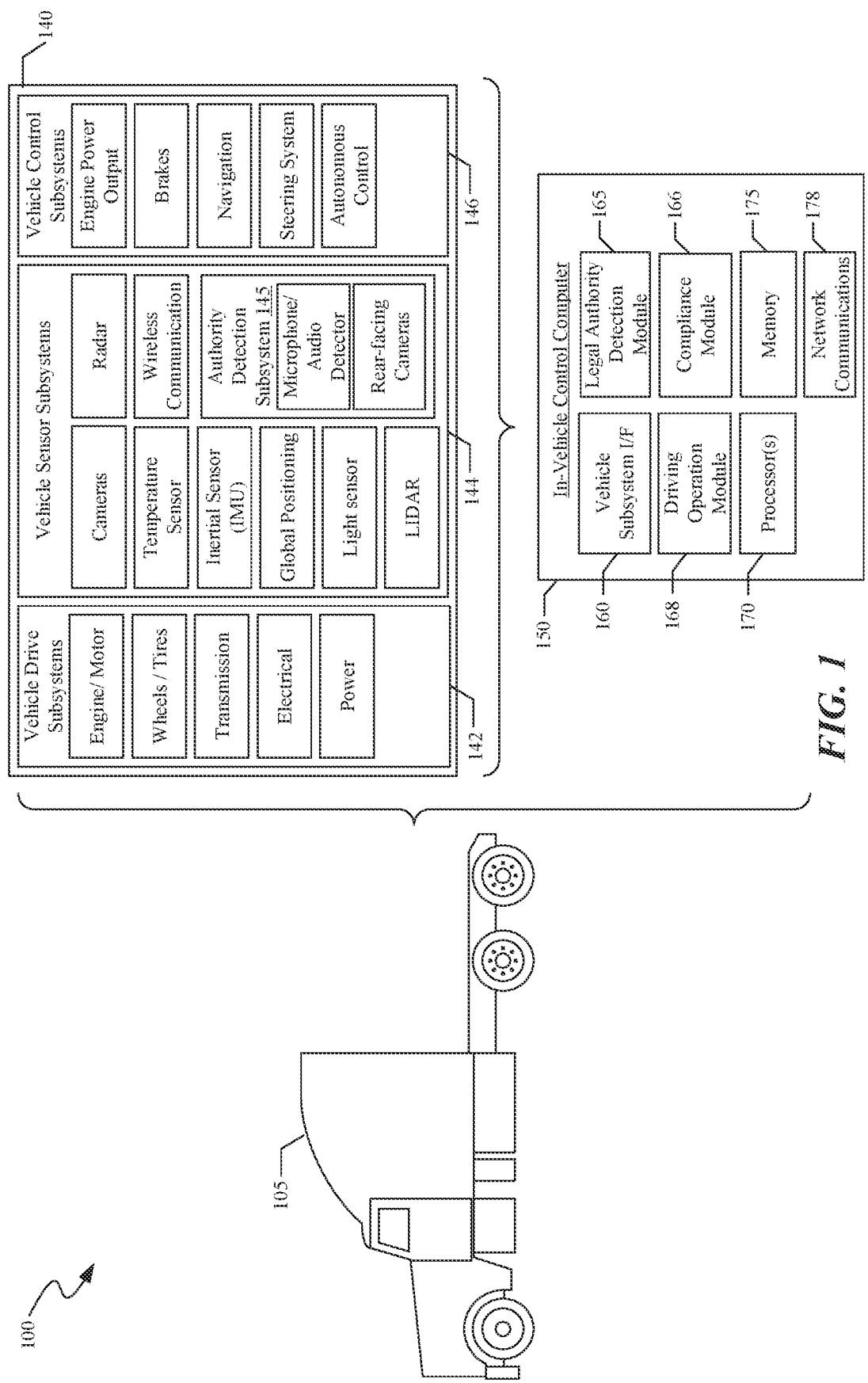
FIG. 1 illustrates a schematic diagram of a system including an autonomous vehicle.

FIG. 1 shows a system 100 that includes an autonomous vehicle 105, such as an autonomous tractor trailer vehicle. The autonomous vehicle 105 includes a plurality of vehicle subsystems 140 and an in-vehicle control computer 150 The plurality of vehicle subsystems 140 includes vehicle drive subsystems 142, vehicle sensor subsystems 144, and vehicle control subsystems. An engine or motor, wheels and tires, a transmission, an electrical subsystem, and a power subsystem may be included in the vehicle drive subsystems. The engine of the autonomous vehicle may be an internal combustion engine, a fuel-cell powered electric engine, a battery powered electrical engine, a hybrid engine, or any other type of engine capable of moving the wheels on which the autonomous vehicle 105 moves. The autonomous vehicle 105 have multiple motors or actuators to drive the wheels of the vehicle, such that the vehicle drive subsystems 142 include two or more electrically driven motors. The transmission may include a continuous variable transmission or a set number of gears that translate the power created by the engine into a force that drives the wheels of the vehicle. The vehicle drive subsystems may include an electrical system that monitors and controls the distribution of electrical current to components within the system, including pumps, fans, and actuators. The power subsystem of the vehicle drive subsystem may include components that regulate the power source of the vehicle.

Vehicle sensor subsystems 144 can include sensors for general operation of the autonomous vehicle 105 and an authority detection subsystem 145. The sensors for general operation of the autonomous vehicle may include cameras, a temperature sensor, a inertial sensor (IMU), a global positioning system, a light sensor, a LIDAR system, a radar system, and wireless communications.

An audio detector, such as a microphone or array of microphones, may be included in the authority detection subsystem 145, as may rear-facing cameras. The audio detector, e.g., microphone(s), of the authority detection subsystem 145 are configured to receive audio indications of the presence of, or instructions from, authorities, including sirens and commands such as "pull over." One or more microphones of the audio detector are mounted or located on the external portion of the vehicle, such as on the outside of the tractor portion of an autonomous vehicle 105. Microphones used in the authority detection subsystem 145 may be any suitable type, mounted such that they are effective both when the autonomous vehicle 105 is at rest, as well as when it is moving at normal driving speeds. The speeds at which the microphone may detect sirens or audio commands from authorities may range from 0 to 50 miles per hour or more. In some configurations, the authority detection subsystem 145 includes microphones that are configured to detect the direction in which the origin of a siren or other intense sound is moving. Microphones may be located on both the driver's side and the passenger's side, or the right and left sides, of the autonomous vehicle body to facilitate the ability of the authority detection subsystem 145 to determine the movement of source of an intense or persistent sound such as a siren wail. As further explained in this patent document, when the audio detector receives an audio indication (e.g., digitized sound recording) of the presence of, or instructions from, authorities, the audio detector sends the received audio indication to the legal authority detection module 165 so that the legal authority detection module 165 can process the audio indication to determine a presence of an authority on the road.

Cameras that are part of the authority detection subsystem 145 may be rear-facing so that flashing lights from emergency vehicles may be observed from all around the autonomous vehicle 105. These cameras may include video cameras, cameras with filters for specific wavelengths, as well as any other cameras suitable to detect emergency vehicle lights based on color, flashing, of both color and flashing. The authority detection subsystem 145 may also use forward facing or side facing cameras from the vehicle sensor subsystem 144. Video data obtained by the authority detection subsystem 145 is sent to the legal authority detection module 165 so that the legal authority detection module 165 can process the video data to determine a presence of an authority on the road.

The vehicle control subsystem 146 may be configured to control operation of the autonomous vehicle, or truck, 105 and its components. Accordingly, the vehicle control subsystem 146 may include various elements such as an engine power output subsystem, a brake unit, a navigation unit, a steering system, and an autonomous control unit. The engine power output may control the operation of the engine, including the torque produced or horsepower provided, as well as provide control the gear selection of the transmission. The brake unit can include any combination of mechanisms configured to decelerate the autonomous vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode. As further explained in this patent document, the devices of the vehicle control subsystem 146 may be controlled by the compliance module 166 and/or driving operation module 168 to perform driving related operations on the autonomous vehicle 105.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LIDAR, the cameras, and/or other vehicle subsystems to determine the driving path or trajectory for the autonomous vehicle 105.

An in-vehicle control computer 150, which may referred to as a VCU, includes a vehicle subsystem interface 160, a driving operation module 168, one or more processors 170, a legal authority detection module 165, a compliance module 166, a memory 175, and a network communications subsystem 178. This in-vehicle control computer 150 controls many, if not all, of the operations of the autonomous vehicle 105 in response to information from the various vehicle subsystems 140 as explained in Section II of this patent document and/or in response to communicating with an oversight system as explained in Section III of this patent document. The one or more processors 170 execute the operations associated with the legal authority detection module 165 that allow the system to determine that an authority, such as a law enforcement or emergency service vehicle or associated personnel, are nearby and/or giving instructions. Data from the authority detection subsystem 145 is provided to the legal authority detection module 165 so that the determination of a presence of an authority can be made. The compliance module 166 receives from the legal authority detection module 165 an indication that a presence of an authority on the road been determined. In response to the indication, the compliance module 166 can determine the course of action (e.g., driving related operation(s) such as steering, braking, etc.) that should be performed by the autonomous vehicle 105. Data from other vehicle sensor subsystems 144 may be provided to the compliance module so that the course of action may be appropriately determined. Alternatively, or additionally, the compliance module 166 may determine the course of action in conjunction with another operational or control module, such as the driving operation module 168.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer (VCU) 150 may, via the driving operation module 168, control the function of the autonomous vehicle 105 based on inputs received from various vehicle subsystems (e.g., the vehicle drive subsystem 142, the vehicle sensor subsystem 144, and the vehicle control subsystem 146). Additionally, driving operation module 168 may send information to the VCU 150 so that the VCU 150 may send information to the vehicle control subsystems 146 to direct the trajectory, velocity, signaling behaviors, and the like, of the autonomous vehicle 105. The autonomous control vehicle control subsystem may receive a course of action to be taken from the compliance module 166 and/or the driving operation module 168 of the VCU 150 and consequently relay instructions to other subsystems to execute the course of action.

II. Legal Authority Detection and Autonomous Driving Compliance Techniques

Figure 2:
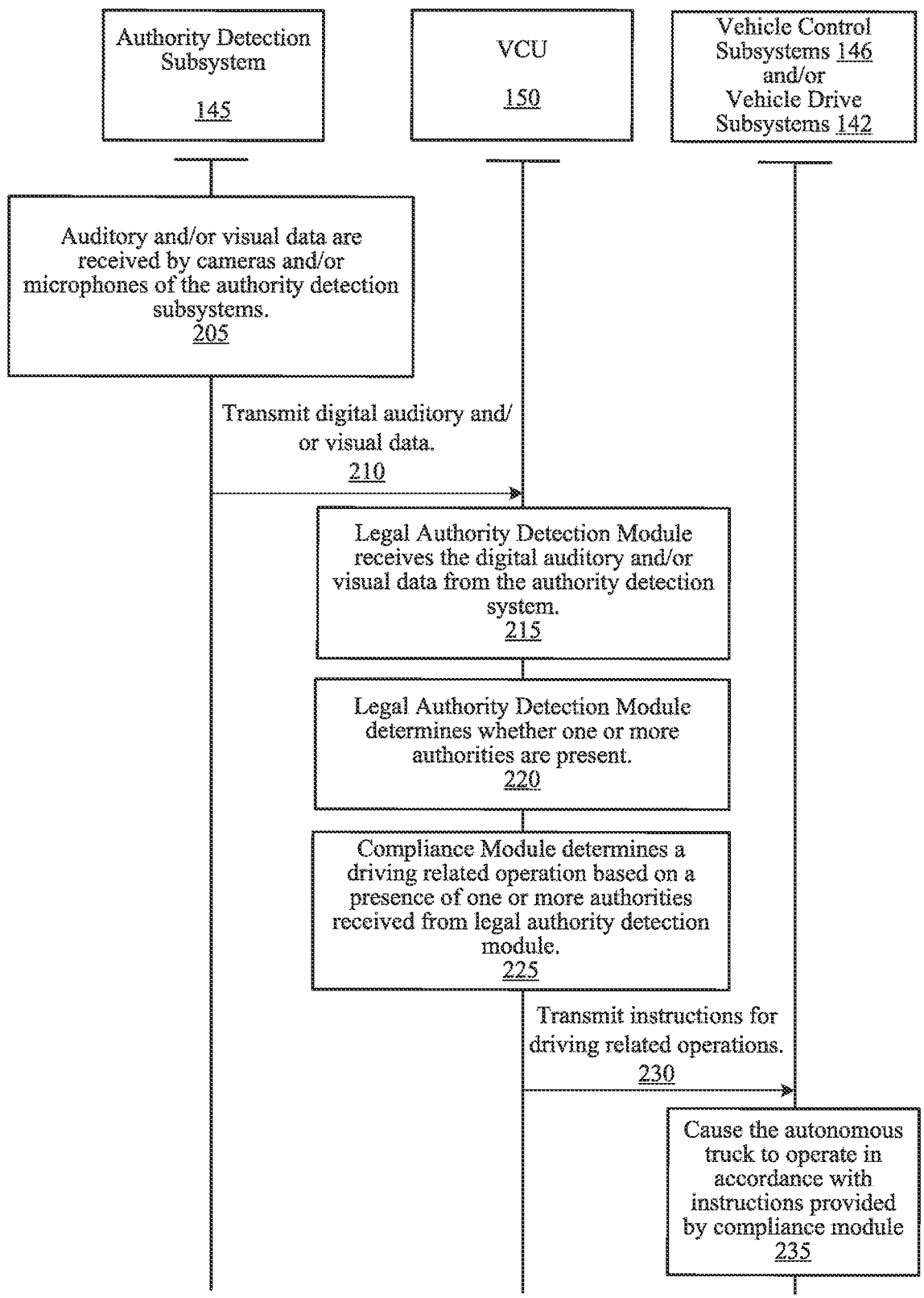
FIG. 2 is an exemplary method for detecting authorities and operating an autonomous vehicle in compliance with instructions and legal requirements.

FIG. 2 shows a flow diagram for the detection of legal authorities and compliance with any laws or explicit instructions given. The authority detection subsystem 145 receives visual, auditory, or both visual and auditory signals via cameras or microphones at operation 205. The one or more microphone and/or one or more cameras associated with the authority detection subsystem 145 can provide digital auditory (or audio) data and/or digital visual (or video) data. At operation 210, the digital visual and/or auditory data is/are transmitted from the authority detection subsystem 145 to the in-vehicle control computer system (VCU) 150 for signal processing.

At operation 215, the legal authority detection module receives the digital visual and/or auditory data transmitted from the authority detection system. At operation 220, the legal authority detection module performs signal processing on the digital auditory and/or visual data to determine whether one or more authorities are located on the road within an area of a location of the autonomous vehicle. In some embodiments, the legal authority detection module can process the digital visual data received from one or more cameras on the autonomous vehicle to determine a presence of a law enforcement vehicle, fire truck or ambulance in the images of the digital visual data. In some embodiments, the legal authority detection module can determine, using digital auditory and/or visual data received over time, that a law enforcement vehicle, fire truck or ambulance in the road is driving towards the autonomous vehicle or driving away from the vehicle. In such embodiments, the legal authority detection module can first determine a presence of an authority (e.g., ambulance) using digital auditory and/or visual data obtained from the authority detection subsystems at a first time. The legal authority detection module can also determine a first number of pixels associated with the authority (e.g., ambulance) and/or a first sound level (e.g., in decibels) of the siren operated by the authority (e.g., ambulance) from the digital visual data and/or the digital auditory data obtained at the first time, respectively.

Next, the legal authority detection module can determine from another digital auditory and/or visual data obtained from the authority detection subsystems at a second time a second number of pixels associated with the authority and/or a second sound level of the siren associated with the authority, where the second time is later in time than the first time. In this embodiment, the legal authority detection module can determine that the authority is driving towards the autonomous vehicle upon determining that the second number of pixels is greater than the first number of pixels and/or that the second sound level is greater than the first sound level. The legal authority detection module can determine that the authority is driving away from the autonomous vehicle by determining that the second number of pixels is less than the first number of pixels and/or that the second sound level is less than the first sound level. In some embodiments, the legal authority detection module can use image processing techniques to determine one or more of the following information about the authority: identity (e.g., law enforcement vehicle) of the authority, the location of the authority, and/or the speed of the authority (if applicable), direction in which the authority if traveling (if applicable, e.g., towards or away from the autonomous vehicle), and/or whether the authority is operating its siren.

In some embodiments, the legal authority detection module can determine the direction in which the authority is driving towards, away from, or around the autonomous vehicle by identifying the cameras that obtained the video data comprising the authority and by determining the direction(s) in which the cameras are facing. In some embodiments, the legal authority detection module can determine the direction in which the authority is driving towards or around the autonomous vehicle by comparing sound levels of a siren captured by multiple microphones that may be located at several places on the autonomous vehicle. In some embodiments, the legal authority detection module can use the digital visual data obtained from one or more cameras to determine that the authority (e.g., law enforcement vehicle or first responder vehicle) is on a road that is separate from or is same as the road on which the autonomous vehicle is operating.

In an example implementation, the legal authority detection module can compare the digital auditory data with a previously stored audio data of a siren in the VCU to determine whether a law enforcement vehicle, fire truck and/or ambulance operating a siren is/are driving or located close to the autonomous vehicle. In another example implementation, the legal authority detection module can compare the digital visual data with previously stored images of a law enforcement vehicle, fire truck and/or ambulance in the VCU to determine whether a law enforcement vehicle, fire truck and/or ambulance is/are driving or located close to the autonomous vehicle.

In some embodiments, the legal authority detection module can determine, using digital visual data, a presence of a visual instruction from authorities such as flares, cones, or signage. In some embodiments, the legal authority detection module can determine, using digital visual data, that an official is present on a road (e.g., a police officer is walking next to the road or a construction worker is directing traffic, etc.). In some embodiments, the legal authority detection module can process the digital auditory data received from a microphone to determine an absence of a siren sound that is associated with a law enforcement vehicle, fire truck or ambulance. In some embodiments, the legal authority detection module can process the digital visual data received from one or more cameras on the autonomous vehicle to determine an absence of a law enforcement vehicle, fire truck or ambulance in the images of the digital visual data.

At operation 225, the legal authority detection module can send an information to the compliance module indicating a presence (or absence) of one or more authorities in an area where the autonomous vehicle is operating. In some embodiments, the information about the authority sent by the legal authority detection module to the compliance module can include an indication that the authority is present in the area where the autonomous vehicle is operating, an identification of the authority (e.g., law enforcement vehicle), the location of the authority, the speed of the authority (if applicable), the direction in which the authority is traveling (if applicable, e.g., towards or away from the autonomous vehicle), and/or whether the authority is operating its siren. Based on the information about the authority received from the legal authority detection module, at operation 225, the compliance module can determine a driving related operation (e.g., steering, braking, changing lanes, stopping, etc.) for the autonomous vehicle to perform as further explained below.

For example, when the compliance module determines that an authority driving towards the autonomous vehicle and/or is located within a pre-determined distance of the autonomous vehicle and/or the authority is operating its siren, then the compliance module can determine and send instructions for driving related operation (at operation 230) to the steering system to the brakes to steer the autonomous vehicle and to apply brakes to stop the autonomous vehicle along the side of the road. In another example, if the compliance module determines that an authority is stopped or parked next to a road having one or more lanes (or on a shoulder of the road), and if the compliance module determines that the autonomous vehicle is driving at a speed higher than a threshold (e.g., pre-determined) value, then the compliance module can determine an amount of braking force to apply to reduce the autonomous vehicle's speed to the threshold value or to a speed less than the threshold value. In this example, the compliance module can send instructions for a driving related operation to apply the amount of braking force (e.g., braking pressure, frictional force applied to slow wheels, clamping force exerted by calipers) to lower the speed to the threshold value or to another speed less than the threshold value to drive safely next to the stopped or parked authority. In this example, the compliance module can send instructions for a driving related operation (at operation 230) to apply the amount of braking force to lower the speed to the threshold value upon determining that the autonomous vehicle's speed is greater than a threshold value, and upon determining that the autonomous vehicle is driving on the right-most lane or the left-most lane that is immediately adjacent to an area or location or another lane on the road where the authority is stopped or parked.

In yet another example, if the compliance module determines that an authority is stopped or parked next to a road having multiple lanes (or on a shoulder of the road), and if the compliance module determines that the autonomous vehicle is driving on a first lane (e.g., the right-most lane or the left-most lane) that is immediately adjacent to the location on the road where the authority is stopped or parked, then the compliance module can send instructions for a driving related operation (at operation 230) to the steering system to change lanes from the first lane to the second lane so that there is at least one lane in between the lane where the autonomous vehicle is driving and the stopped or parked authority. In this example, the compliance module can determine an amount of steering needed to steer the autonomous vehicle from the first lane to the second lane.

In yet another example, the compliance module can receive traffic information of an area towards which the autonomous vehicle is driving, where the traffic information indicates a level of traffic (e.g., high, medium, low) of the area. In this example, if the compliance module determines that the authority is stopped or parked in that area and if the compliance module determines that the traffic information indicates that traffic in that area is high, then the compliance module can determine whether an alternate route (e.g., route other than one on which the autonomous vehicle is driving) exists to reroute the autonomous vehicle. In this example, if the compliance module determines that the autonomous vehicle can be rerouted to the alternate route around the high traffic area to its destination, then the compliance module can determine and send to the steering system, brakes, transmission, and/or other devices in the autonomous vehicle instructions related to the driving related operations to drive the autonomous vehicle on the alternate route.

In some embodiments, the compliance module can determine the driving related operations as explained above based on the law of the state or country or area in which the autonomous vehicle is driving. The VCU can store a look-up table that includes a pre-configured set of rules applicable to authorities for various states or areas in which the autonomous vehicle is expected to be driven. Each rule in the pre-configured set of rules may include an identification of a state or area and a driving related rule associated with at least one authority or emergency vehicle on the road for that state or area. For example, one entry in the look-up table may indicate an identification of a first state or a first area and a description of an associated driving related rule that states that there must be at least one lane in between the location of the autonomous vehicle and the authority when the authority is parked or stopped next to the road with its lights flashing. In another example, another entry in the look-up table may indicate an identification of a second state or a second area and a description of an associated driving related rule that states that a vehicle's speed must be at or below a threshold value if an authority is parked or stopped next to the road on which vehicles are driving or if an authority or emergency vehicle (e.g., construction signage) indicates that construction is being performed on the road. The compliance module can access the look-up table using the location of the autonomous vehicle (e.g., obtained from a GPS device on or in the autonomous vehicle) to determine relevant rules or laws of the state or area in which the autonomous vehicle is driving. In some embodiments, the look-up table may include multiple rules associated with a state or an area. For example, the look-up table may indicate that in response to an authority located on the road with its lights flashing and/or its siren operating, a vehicle is expected either to move to another lane to keep a one-lane distance between the vehicle and the authority if the vehicle is in a lane adjacent to the authority or the vehicle is expected to slow down to a pre-determined speed if the vehicle cannot move over to the another lane. Based on the rules or laws of the area where the autonomous vehicle is driving, the compliance module can send driving related operations to the autonomous vehicle to comply with local or state rules or law.

In some embodiments, the compliance module can send information related to the driving related operations to be displayed on a display monitor in the autonomous vehicle to inform a human driver in the autonomous vehicle.

At operation 230, the driving related operations determined by the compliance module can be transmitted from the VCU 150 to one or more devices in the vehicle control subsystems and/or to other devices (e.g., transmission in vehicle drive subsystem 142) in the autonomous vehicle. At operation 235, the devices of the vehicle control subsystem 146 and/or the vehicle drive subsystem 142 can perform driving related operations based on the instructions provided by the compliance module as explained above. The vehicle control subsystems and/or the vehicle drive subsystems then cause the autonomous vehicle 105 to operate in accordance with the driving related operations received from the VCU 150.

III. Oversight System

Figure 3:
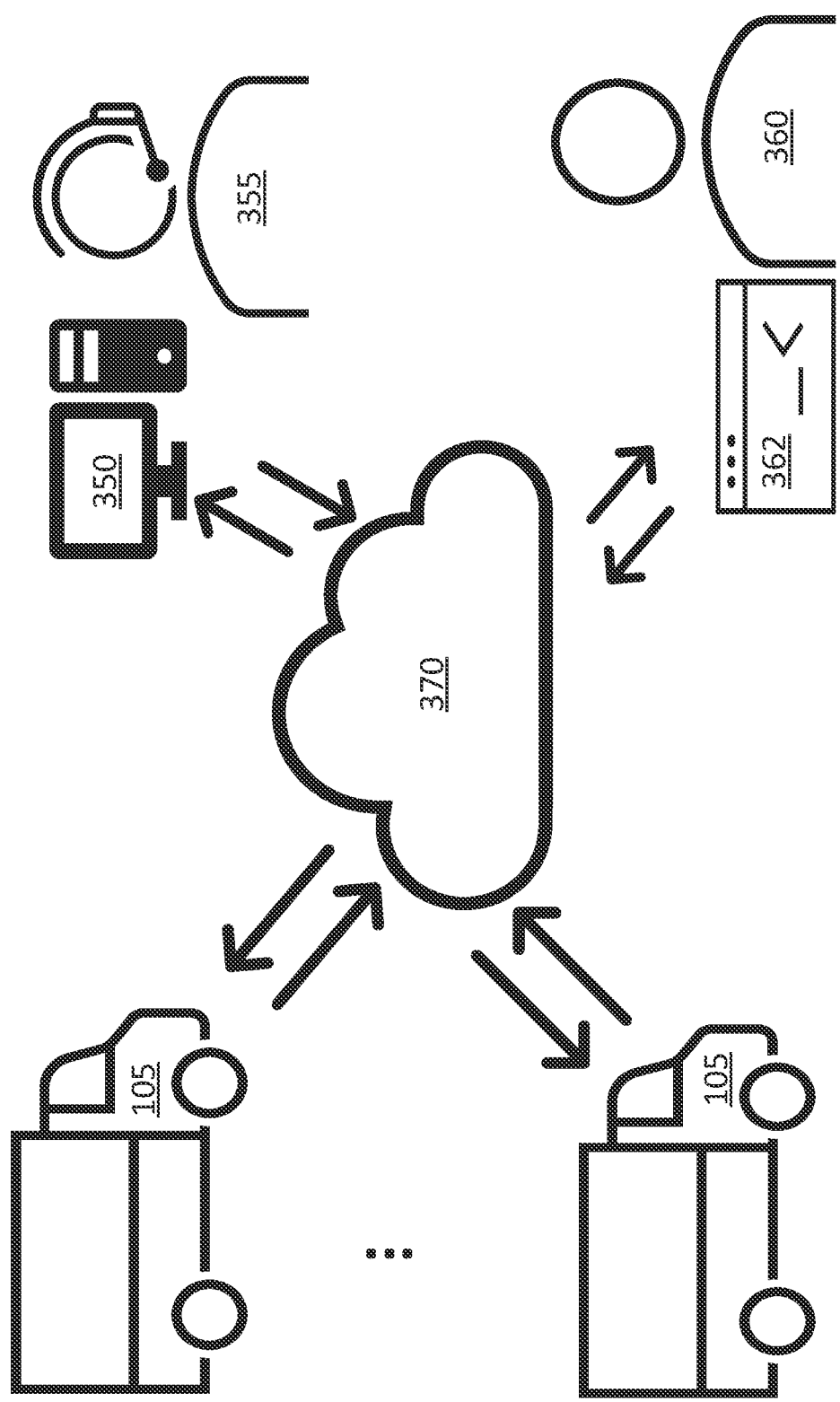
FIG. 3 illustrates a system that includes one or more autonomous vehicles, a control center or oversight system with a human operator and/or an interface for third-party interaction.

FIG. 3 illustrates a system 300 that includes one or more autonomous vehicles 105, a control center or oversight system 350 with a human operator 355, and an interface 362 for third-party personnel 360 interaction. A human operator 355 may also be known as a remoter center operator (RCO). Communications between the autonomous vehicles 105, oversight system 350 and user interface 362 take place over a network 370. In some instances, where not all the autonomous vehicles 105 in a fleet are able to communicate with the oversight system 350, the autonomous vehicles 105 may communicate with each other over the network 370 or directly. As described with respect to FIG. 1, the VCU 150 of each autonomous vehicle 105 may include a module for network communications 178.

An autonomous vehicle may be in communication with an oversight system. The oversight system may include one or more computers or servers that may serve many purposes, including: tracking the progress of one or more autonomous vehicles (e.g., an autonomous vehicle); tracking the progress of a fleet of autonomous vehicles; sending maneuvering instructions to one or more autonomous vehicles; monitoring the health of the autonomous vehicle(s); monitoring the status of the cargo of each autonomous vehicle in contact with the oversight system; facilitate communications between third parties (e.g., law enforcement, clients whose cargo is being carried) and each, or a specific, autonomous vehicle; allow for tracking of specific autonomous vehicles in communication with the oversight system (e.g., third-party tracking of a subset of vehicles in a fleet); arranging maintenance service for the autonomous vehicles (e.g., oil changing, fueling, maintaining the levels of other fluids); alerting an affected autonomous vehicle of changes in traffic or weather that may adversely impact a route or delivery plan; pushing over the air updates to autonomous vehicles to keep all components up to date; and other purposes or functions that improve the safety for the autonomous vehicle, its cargo, and its surroundings. An oversight system may also determine performance parameters of an autonomous vehicle or autonomous vehicles, including any of: data logging frequency, compression rate, location, data type; communication prioritization; how frequently to service the autonomous vehicle (e.g., how many miles between services); when to perform a minimal risk condition (MRC) maneuver while monitoring the vehicle's progress during the maneuver; when to hand over control of the autonomous vehicle to a human driver (e.g., at a destination yard); ensuring an autonomous vehicle passes pre-trip inspection; ensuring an autonomous vehicle performs or conforms to legal requirements at checkpoints and weight stations; ensuring an autonomous vehicle performs or conforms to instructions from a human at the site of a roadblock, cross-walk, intersection, construction, or accident; and the like.

A compliance module of an autonomous vehicle can send to an oversight system the following information as explained in Section II of this patent document: information about the authority received from legal authority detection module, and/or driving related operations determined by the compliance module. In some embodiments, the oversight system 350 or the interface 362 can display on a monitor that an authority has been detected in response to which the human operator 355 or a third party personnel 360 can send via the oversight system 350 or the interface 362 instructions for driving related operations to the compliance module to send to the vehicle control subsystem 146 and/or vehicle drive subsystem 142. In some embodiments, if the oversight system 350 or interface 362 displays on a monitor the driving related operations determined by the compliance module, a person may override or adjust the driving related operations. In such embodiments, for example, the human operator 355 or the third party personnel 360 may, via the oversight system 350 or the interface 362, send instructions to the compliance module to send instructions to the vehicle control subsystem 146 to lower the autonomous vehicle's speed to a certain value lower than the predetermined value determined by the compliance module. In another example, the human operator 355 or third party personnel 360 may via the oversight system 350 or the interface 362 send instruction to the compliance module to send instructions to the vehicle control subsystem 146 to exit a highway or freeway.

To allow for communication between autonomous vehicles in a fleet and an oversight system or command center, each autonomous vehicle may be equipped with a communication gateway. The communication gateway may have the ability to do any of the following: allow for AV to oversight system communication (i.e. V2C) and the oversight system to AV communication (C2V); allow for AV to AV communication within the fleet (V2V); transmit the availability or status of the communication gateway; acknowledge received communications; ensure security around remote commands between the AV and the oversight system; convey the AV's location reliably at set time intervals; enable the oversight system to ping the AV for location and vehicle health status; allow for streaming of various sensor data directly to the command or oversight system; allow for automated alerts between the AV and oversight system; comply to ISO 21434 standards; and the like.

An oversight system or command center may be operated by one or more human, also known as an operator or a remote center operator (RCO). The operator may set thresholds for autonomous vehicle health parameters, so that when an autonomous vehicle meets or exceeds the threshold, precautionary action may be taken. Examples of vehicle health parameters for which thresholds may be established by an operator may include any of: fuel levels; oil levels; miles traveled since last maintenance; low tire-pressure detected; cleaning fluid levels; brake fluid levels; responsiveness of steering and braking subsystems; Diesel exhaust fluid (DEF) level; communication ability (e.g., lack of responsiveness); positioning sensors ability (e.g., GPS, IMU malfunction); impact detection (e.g., vehicle collision); perception sensor ability (e.g., camera, LIDAR, radar, microphone array malfunction); computing resources ability (e.g., VCU or ECU malfunction or lack of responsiveness, temperature abnormalities in computing units); angle between a tractor and trailer in a towing situation (e.g., tractor-trailer, 18-wheeler, or semi-truck); unauthorized access by a living entity (e.g., a person or an animal) to the interior of an autonomous vehicle; and the like. The precautionary action may include execution of a minimal risk condition (MRC) maneuver, seeking service, or exiting a highway or other such re-routing that may be less taxing on the autonomous vehicle. An autonomous vehicle whose system health data meets or exceeds a threshold set at the oversight system or by the operator may receive instructions that are automatically sent from the oversight system to perform the precautionary action.

The operator may be made aware of situations affecting one or more autonomous vehicles in communication with or being monitored by the oversight system that the affected autonomous vehicle(s) may not be aware of. Such situations may include: irregular or sudden changes in traffic flow (e.g., traffic jam or accident); abrupt weather changes; abrupt changes in visibility; emergency conditions (e.g., fire, sinkhole, bridge failure); power outage affecting signal lights; unexpected road work; large or ambiguous road debris (e.g., object unidentifiable by the autonomous vehicle); law enforcement activity on the roadway (e.g., car chase or road clearing activity); and the like. These types of situations that may not be detectable by an autonomous vehicle may be brought to the attention of the oversight system operator through traffic reports, law enforcement communications, data from other vehicles that are in communication with the oversight system, reports from drivers of other vehicles in the area, and similar distributed information venues. An autonomous vehicle may not be able to detect such situations because of limitations of sensor systems or lack of access to the information distribution means (e.g., no direct communication with weather agency). An operator at the oversight system may push such information to affected autonomous vehicles that are in communication with the oversight system. The affected autonomous vehicles may proceed to alter their route, trajectory, or speed in response to the information pushed from the oversight system. In some instances, the information received by the oversight system may trigger a threshold condition indicating that MRC (minimal risk condition) maneuvers are warranted; alternatively, or additionally, an operator may evaluate a situation and determine that an affected autonomous vehicle should perform a MRC maneuver and subsequently send such instructions to the affected vehicle. In these cases, each autonomous vehicle receiving either information or instructions from the oversight system or the oversight system operator uses its on-board computing unit (i.e. VCU) to determine how to safely proceed, including performing a MRC maneuver that includes pulling-over or stopping.

Other interactions that the remote center operator (RCO) may have with an autonomous vehicle or a fleet of autonomous vehicle includes any of the following. A computer of the oversight system 350 may receive from a first autonomous vehicle an indication of a presence of an authority within a first pre-determined distance of the location of the first autonomous vehicle and/or relevant information about the authority (e.g., position information of the authority).

The computer of the oversight system 350 may also obtain position information of one or more autonomous vehicle that may be monitored by the computer of the oversight system 350. Using a location information of a second autonomous vehicle and the position information of the authority, the computer of the oversight system 350 may determine that the second autonomous vehicle is located within a second pre-determined distance of the location of the authority. The computer of the oversight system 350 may send information about the authority received from the autonomous vehicle to the second autonomous vehicle upon determining that the second autonomous vehicle is driving towards the authority and is within the second pre-determined distance of a location of the authority, where the second pre-determined distance is greater than or equal to the first pre-determined distance. The information about the authority provided to the second autonomous vehicle can enable the compliance module of the second autonomous vehicle to determine driving related operations based on the presence of the authority at the location. In some embodiments, a human operator 355 or a third-party personnel 360 can via the oversight system 350 or the interface 362 send information to the second autonomous vehicle to perform certain driving related operations (e.g., reroute the second autonomous vehicle or exit the highway, etc.).

In some embodiments, the information about the authority may be sent by the compliance module of an autonomous vehicle upon determining that certain information about the authority cannot be adequately determined. For example, if the legal authority detection module cannot determine information conveyed by a traffic sign posted on a road or whether a vehicle belongs to law enforcement, the legal authority detection module indicate a lack of determination of an attribute of the authority to the compliance module and the compliance module can send information about the authority (e.g., images) to the oversight system for a human to assist in determining the driving related operation.

An oversight system or command center may allow a third party to interact with the oversight system operator, with an autonomous vehicle, or with both the human system operator and an autonomous vehicle. A third party may be a customer whose goods are being transported, a law enforcement or emergency services provider, or a person assisting the autonomous vehicle when service is needed.

Actions that an autonomous vehicle, particularly an autonomous vehicle, as described herein may be configured to execute to safely traverse a course while abiding by the applicable rules, laws, and regulations may include those actions successfully accomplished by an autonomous vehicle driven by a human. These actions, or maneuvers, may be described as features of the truck, in that these actions may be executable programming stored on the VCU 150 (i.e., the in-vehicle control computer unit). These actions or features may include those related to reactions to the detection of certain types of conditions or objects such as: appropriate motion in response to detection of an emergency vehicle with flashing lights; appropriate motion in response to detecting one or more vehicles approaching the AV, motions or actions in response to encountering an intersection; execution of a merge into traffic in an adjacent lane or area of traffic; detection of need to clean one or more sensor and the cleaning of the appropriate sensor; and the like. Other features of an autonomous vehicle may include those actions or features which are needed for any type of maneuvering, including that needed to accomplish the features or actions that are reactionary, listed above. Such features, which may be considered supporting features, may include: the ability to maintain an appropriate following distance; the ability to turn right and left with appropriate signaling and motion, and the like. These supporting features, as well as the reactionary features listed above, may include controlling or altering the steering, engine power output, brakes, or other vehicle control subsystems 146.

Figure 4:
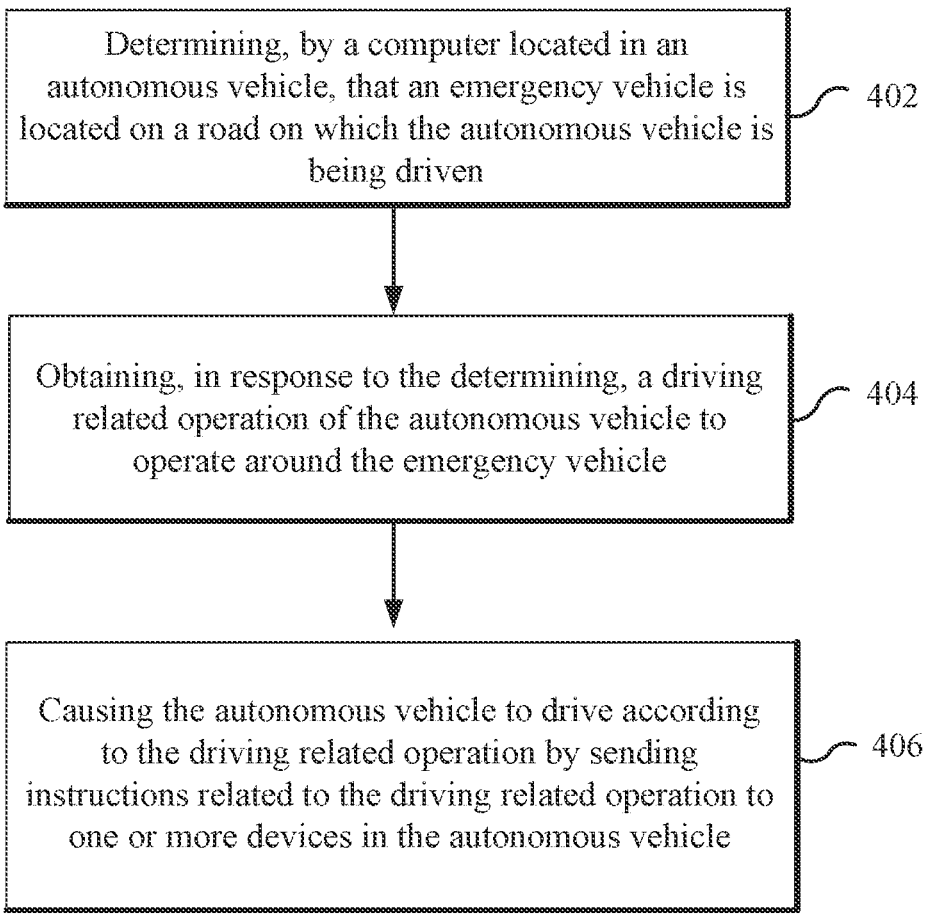
FIG. 4 illustrates an example flowchart of operations performed by an autonomous vehicle.

FIG. 4 illustrates an example flowchart of operations performed by an autonomous vehicle. Operation 402 includes determining, by a computer located in an autonomous vehicle, that an emergency vehicle is located on a road on which the autonomous vehicle is being driven. Operation 404 includes obtaining, in response to the determining, a driving related operation of the autonomous vehicle to operate around the emergency vehicle. Operation 406 includes causing the autonomous vehicle to drive according to the driving related operation by sending instructions related to the driving related operation to one or more devices in the autonomous vehicle.

In some embodiments, the obtaining the driving related operation and the causing the autonomous vehicle to drive according to the driving related operation is performed in response to: (1) the determining that the emergency vehicle is located on the road, and (2) determining that the emergency vehicle is located within a pre-determined distance of a location of the autonomous vehicle. In some embodiments, the obtaining the driving related operation and the causing the autonomous vehicle to drive according to the driving related operation is performed in response to: (1) the determining that the emergency vehicle is located on the road, (2) determining that the emergency vehicle is located within a pre-determined distance of a location of the autonomous vehicle, and (3) determining that the emergency vehicle is operating a siren. In some embodiments, the obtaining the driving related operation includes: performing a first determination that a current speed of the autonomous vehicle is greater than a threshold value, and performing a second determination, in response to the first determination, of an amount of braking force to apply that reduces the current speed of the autonomous vehicle to less than or equal to the threshold value; and the instructions causing the autonomous vehicle to drive according to the driving related operation include a first instruction that cause the autonomous vehicle to apply the amount of braking force.

In some embodiments, the second determination is performed in response to the first determination and in response to a third determination that the autonomous vehicle is driving on a lane on the road immediately adjacent to an area or another lane where the emergency vehicle is located. In some embodiments, the obtaining the driving related operation includes: performing a first determination that the autonomous vehicle is driving on the road on a first lane having one side that is immediately adjacent to an area or another lane where the emergency vehicle is located, performing a second determination that the road includes a second lane immediately adjacent to the first lane and on another side opposite to the one side, and performing a third determination, in response to the first determination and the second determination, of an amount of steering to apply to steer the autonomous vehicle from the first lane to the second lane; the instructions causing the autonomous vehicle to drive according to the driving related operation include a first instruction that cause the autonomous vehicle to apply the amount of steering to steer the autonomous vehicle from the first lane to the second lane.

In some embodiments, a system for autonomous vehicle operation includes an autonomous vehicle comprising a computer that includes a processor configured to implement a method, comprising: determine that an emergency vehicle is located on a road on which the autonomous vehicle is being driven; obtain, in response to the determine, a driving related operation of the autonomous vehicle to operate around the emergency vehicle; and cause the autonomous vehicle to drive according to the driving related operation by the processor configured to send instructions related to the driving related operation to one or more devices in the autonomous vehicle.

In some embodiments, the processor of the computer is further configured to: send, to a second computer located outside of the autonomous vehicle, information related to the emergency vehicle, where the information includes a position information that indicates a position of the emergency vehicle, and where the information indicates that the emergency vehicle is located within a first pre-determined distance of a location of the autonomous vehicle; and where the second computer comprises a second processor configured to implement a second method, comprising: receive the information related to the emergency vehicle; in response to a determination that the second autonomous vehicle is located within a second pre-determined distance of a position of the emergency vehicle and that the second autonomous vehicle is driving towards the emergency vehicle: send the information related to the emergency vehicle to a second autonomous vehicle, where the second pre-determined distance is greater than or equal to the first pre-determined distance.

In some embodiments, the obtain the driving related operation is performed by the processor configured to: receive a traffic information of an area towards which the autonomous vehicle is driving; determine, based on the traffic information, that the area has a high traffic level; determine an alternate route to drive the autonomous vehicle around the area having the high traffic level; and determine the instructions for any one or more of a steering system, brakes, or transmission to cause the autonomous vehicle to drive on the alternate route. In some embodiments, the instructions for the driving related operation include a first instruction to apply brakes and a second instruction steer the autonomous vehicle from a lane on the road on which the autonomous vehicle is being driven and to an area along a side of the road. In some embodiments, the emergency vehicle includes a law enforcement vehicle, an ambulance, a fire engine, or a fire truck. In some embodiments, the emergency vehicle includes a stationary object that includes a traffic cone, a flare, or a traffic related signage.

In some embodiments, a non-transitory computer readable program storage medium having code stored thereon, the code, when executed by a processor, causing the processor to implement a method comprising: determining, by a computer located in an autonomous vehicle, that an emergency vehicle is located on a road on which the autonomous vehicle is being driven; obtaining, in response to the determining, a driving related operation of the autonomous vehicle to operate around the emergency vehicle; and causing the autonomous vehicle to drive according to the driving related operation by sending instructions related to the driving related operation to one or more devices in the autonomous vehicle.

In some embodiments, the obtaining the driving related operation and the causing the autonomous vehicle to drive according to the driving related operation is performed in response to: (1) determining that the emergency vehicle is driving towards the autonomous vehicle, (2) determining that the emergency vehicle is located within a pre-determined distance of a location of the autonomous vehicle, and (3) determining that the emergency vehicle is operating a siren. In some embodiments, the emergency vehicle is determined to be driving towards the autonomous vehicle upon determining that a first number of pixels associated with the emergency vehicle in a first image is less than a second number of pixels associated with the emergency vehicle in a second image, the first image and the second image are obtained by a camera on the autonomous vehicle, and the first image is obtained at a first time that is earlier in time than a second time when the second image is obtained. In some embodiments, the emergency vehicle is determined to be driving towards the autonomous vehicle upon determining that a first sound level associated with the siren is less than a second sound level associated with the siren, the first sound level and the second sound level are obtained by a microphone on the autonomous vehicle, and the first sound level is obtained at a first time that is earlier in time than a second time when the second sound level is obtained.

In some embodiments, the driving related operation is obtained based on a location of the autonomous vehicle and based on a rule associated with the emergency vehicle of a state or of an area in which the autonomous vehicle is located. In some embodiments, the driving related operation is obtained using a pre-configured set of rules stored in the computer for a plurality of states or areas, each rule is associated with at least one state or at least one area and a corresponding driving related rule associated with at least one emergency vehicle, and the plurality of states or areas include the state or the area in which the autonomous vehicle is located. In some embodiments, the method further includes sending, to a second computer located outside of the autonomous vehicle, information related to the emergency vehicle; and where the obtaining the driving related operation includes receiving, from the second computer, the instructions related to the driving related operation. In some embodiments, the information is sent to the second computer in response to determining that one or more attributes of the emergency vehicle cannot be determined by the computer in the autonomous vehicle.

In example system as described in this patent document comprises an autonomous vehicle (AV) that comprises an authority detection subsystem, an in-vehicle control computer, and an autonomous control subsystem. The in-vehicle control computer comprises a legal authority detection module, and a compliance module. In some embodiments, the authority detection subsystem comprises microphones mounted, or located, on an external portion of the autonomous vehicle. In some embodiments, the microphones are mounted such that they are effective both when the autonomous vehicle is at rest, as well as when the autonomous vehicle is moving at normal driving speeds.

An example method for operating an autonomous vehicle comprises detecting, by an authority detection subsystem of the autonomous vehicle, the presence of an authority; determining, by a legal authority detection module of the autonomous vehicle, directions given by the authority; determining, by the compliance module of the autonomous vehicle, that a change of trajectory or route for the autonomous vehicle is required to comply with the directions given by the authority; and modifying the trajectory or route of the autonomous vehicle to comply with the instructions given by the authority.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of autonomous driving operation, comprising:
    determining, by a computer located in an autonomous vehicle, that an emergency vehicle is located on a road on which the autonomous vehicle is being driven;
    obtaining, in response to the determining, a driving related operation of the autonomous vehicle to operate around the emergency vehicle, wherein the obtaining the driving related operation includes:
        performing a first determination that the autonomous vehicle is driving on the road on a first lane having one side that is immediately adjacent to an area or another lane where the emergency vehicle is located,
        performing a second determination that the road includes a second lane immediately adjacent to the first lane and on another side opposite to the one side, and
        performing a third determination, in response to the first determination and the second determination, of an amount of steering to apply to steer the autonomous vehicle from the first lane to the second lane; and
    causing the autonomous vehicle to drive according to the driving related operation by sending instructions related to the driving related operation to one or more devices in the autonomous vehicle, wherein the instructions that cause the autonomous vehicle to drive according to the driving related operation include a first instruction that causes the autonomous vehicle to apply the amount of steering to steer the autonomous vehicle from the first lane to the second lane.

2. The method of claim 1, wherein the obtaining the driving related operation and the causing the autonomous vehicle to drive according to the driving related operation is performed in response to:
    (1) the determining that the emergency vehicle is located on the road, and
    (2) determining that the emergency vehicle is located within a pre-determined distance of a location of the autonomous vehicle.

3. The method of claim 1, wherein the obtaining the driving related operation and the causing the autonomous vehicle to drive according to the driving related operation is performed in response to:
    (1) the determining that the emergency vehicle is located on the road,
    (2) determining that the emergency vehicle is located within a pre-determined distance of a location of the autonomous vehicle, and
    (3) determining that the emergency vehicle is operating a siren.

4. The method of claim 1,
    wherein the obtaining the driving related operation includes:
        performing a fourth determination that a current speed of the autonomous vehicle is greater than a threshold value, and
        performing a fifth determination, in response to the fourth determination, of an amount of braking force to apply that reduces the current speed of the autonomous vehicle to less than or equal to the threshold value; and
    wherein the instructions causing the autonomous vehicle to drive according to the driving related operation include a second instruction that cause the autonomous vehicle to apply the amount of braking force.

5. The method of claim 4, wherein the fifth determination is performed in response to the fourth determination and in response to the first determination that the autonomous vehicle is driving on the lane on the road immediately adjacent to the area or the another lane where the emergency vehicle is located.

6. A system for autonomous vehicle operation, the system comprising an autonomous vehicle comprising a computer that includes a processor configured to implement a method, comprising:
    determine that an emergency vehicle is located on a road on which the autonomous vehicle is being driven;
    obtain, in response to the determine, a driving related operation of the autonomous vehicle to operate around the emergency vehicle, wherein the obtain the driving related operation includes:
        perform a first determination that the autonomous vehicle is driving on the road on a first lane having one side that is immediately adjacent to an area or another lane where the emergency vehicle is located,
        perform a second determination that the road includes a second lane immediately adjacent to the first lane and on another side opposite to the one side, and
        perform a third determination, in response to the first determination and the second determination, of an amount of steering to apply to steer the autonomous vehicle from the first lane to the second lane; and
    cause the autonomous vehicle to drive according to the driving related operation by the processor configured to send instructions related to the driving related operation to one or more devices in the autonomous vehicle, wherein the instructions that cause the autonomous vehicle to drive according to the driving related operation include a first instruction that causes the autonomous vehicle to apply the amount of steering to steer the autonomous vehicle from the first lane to the second lane.

7. The system of claim 6,
    wherein the processor of the computer is further configured to:
        send, to a second computer located outside of the autonomous vehicle, information related to the emergency vehicle,
            wherein the information includes a position information that indicates a position of the emergency vehicle, and
            wherein the information indicates that the emergency vehicle is located within a first pre-determined distance of a location of the autonomous vehicle; and
    wherein the second computer comprises a second processor configured to implement a second method, comprising:
        receive the information related to the emergency vehicle;
        in response to a determination that the second autonomous vehicle is located within a second pre-determined distance of the position of the emergency vehicle and that the second autonomous vehicle is driving towards the emergency vehicle:
  send the information related to the emergency vehicle to a second autonomous vehicle,
    wherein the second pre-determined distance is greater than or equal to the first pre-determined distance.

8. The system of claim 6, wherein the obtain the driving related operation is performed by the processor configured to:
  receive a traffic information of a region towards which the autonomous vehicle is driving;
  determine, based on the traffic information, that the region has a high traffic level;
  determine an alternate route to drive the autonomous vehicle around the region having the high traffic level; and
  determine the instructions for any one or more of a steering system, brakes, or transmission to cause the autonomous vehicle to drive on the alternate route.

9. The system of claim 6, wherein the instructions for the driving related operation include a second instruction to apply brakes and a third instruction to steer the autonomous vehicle from the lane on the road on which the autonomous vehicle is being driven and to another area along a side of the road.

10. The system of claim 6, wherein the emergency vehicle includes a law enforcement vehicle, an ambulance, a fire engine, or a fire truck.

11. The system of claim 6, wherein the emergency vehicle includes a stationary object that includes a traffic cone, a flare, or a traffic related signage.

12. A non-transitory computer readable program storage medium having code stored thereon, the code, when executed by a processor, causing the processor to implement a method comprising:
  determining, by a computer located in an autonomous vehicle, that an emergency vehicle is located on a road on which the autonomous vehicle is being driven;
  obtaining, in response to the determining, a driving related operation of the autonomous vehicle to operate around the emergency vehicle, wherein the obtaining the driving related operation includes:
    performing a first determination that the autonomous vehicle is driving on the road on a first lane having one side that is immediately adjacent to an area or another lane where the emergency vehicle is located,
    performing a second determination that the road includes a second lane immediately adjacent to the first lane and on another side opposite to the one side, and
  performing a third determination, in response to the first determination and the second determination, of an amount of steering to apply to steer the autonomous vehicle from the first lane to the second lane; and
  causing the autonomous vehicle to drive according to the driving related operation by sending instructions related to the driving related operation to one or more devices in the autonomous vehicle, wherein the instructions that cause the autonomous vehicle to drive according to the driving related operation include a first instruction that causes the autonomous vehicle to apply the amount of steering to steer the autonomous vehicle from the first lane to the second lane.

13. The non-transitory computer readable program storage medium of claim 12, wherein the obtaining the driving related operation and the causing the autonomous vehicle to drive according to the driving related operation is performed in response to:
  (1) determining that the emergency vehicle is driving towards the autonomous vehicle,
  (2) determining that the emergency vehicle is located within a pre-determined distance of a location of the autonomous vehicle, and
  (3) determining that the emergency vehicle is operating a siren.

14. The non-transitory computer readable program storage medium of claim 13,
  wherein the emergency vehicle is determined to be driving towards the autonomous vehicle upon determining that a first number of pixels associated with the emergency vehicle in a first image is less than a second number of pixels associated with the emergency vehicle in a second image,
  wherein the first image and the second image are obtained by a camera on the autonomous vehicle, and
  wherein the first image is obtained at a first time that is earlier in time than a second time when the second image is obtained.

15. The non-transitory computer readable program storage medium of claim 13,
  wherein the emergency vehicle is determined to be driving towards the autonomous vehicle upon determining that a first sound level associated with the siren is less than a second sound level associated with the siren,
  wherein the first sound level and the second sound level are obtained by a microphone on the autonomous vehicle, and
  wherein the first sound level is obtained at a first time that is earlier in time than a second time when the second sound level is obtained.

16. The non-transitory computer readable program storage medium of claim 12, wherein the driving related operation is obtained based on a location of the autonomous vehicle and based on a rule associated with the emergency vehicle of a state or of another area in which the autonomous vehicle is located.

17. The non-transitory computer readable program storage medium of claim 16,
  wherein the driving related operation is obtained using a pre-configured set of rules stored in the computer for a plurality of states or areas,
  wherein each rule is associated with at least one state or at least one area and a corresponding driving related rule associated with at least one emergency vehicle, and
  wherein the plurality of states or the areas include the state or another area in which the autonomous vehicle is located.

18. The non-transitory computer readable program storage medium of claim 12, further comprising:
  sending, to a second computer located outside of the autonomous vehicle, information related to the emergency vehicle; and
  wherein the obtaining the driving related operation includes receiving, from the second computer, the instructions related to the driving related operation.

19. The non-transitory computer readable program storage medium of claim 18, wherein the information is sent to the second computer in response to determining that one or more attributes of the emergency vehicle cannot be determined by the computer in the autonomous vehicle.

* * * * *